(12) United States Patent
Adjaoute

(10) Patent No.: US 8,458,069 B2
(45) Date of Patent: Jun. 4, 2013

(54) SYSTEMS AND METHODS FOR ADAPTIVE IDENTIFICATION OF SOURCES OF FRAUD

(75) Inventor: Akli Adjaoute, Belvedere, CA (US)

(73) Assignee: Brighterion, Inc., San Francisco, CA (US)

( * ) Notice: Subject to any disclaimer, the term of this patent is extended or adjusted under 35 U.S.C. 154(b) by 0 days.

(21) Appl. No.: 13/041,178

(22) Filed: Mar. 4, 2011

(65) Prior Publication Data

US 2012/0226613 A1 Sep. 6, 2012

(51) Int. Cl.
G06Q 40/00 (2012.01)
G06Q 99/00 (2006.01)
G06Q 40/02 (2006.01)

(52) U.S. Cl.
CPC .............. G06Q 40/02 (2013.01); G06Q 99/00 (2013.01)
USPC ................................. 705/35; 705/44; 705/318

(58) Field of Classification Search
None
See application file for complete search history.

(56) References Cited

U.S. PATENT DOCUMENTS

| | | | |
|---|---|---|---|
| 5,627,886 A * | 5/1997 | Bowman | 379/111 |
| 6,330,546 B1 * | 12/2001 | Gopinathan et al. | 705/35 |
| 6,598,030 B1 * | 7/2003 | Siegel et al. | 705/38 |
| 6,636,833 B1 * | 10/2003 | Flitcroft et al. | 705/64 |
| 6,658,393 B1 * | 12/2003 | Basch et al. | 705/38 |
| 6,839,682 B1 * | 1/2005 | Blume et al. | 705/7.31 |
| 7,058,597 B1 * | 6/2006 | Ronning et al. | 705/26.35 |
| 7,089,592 B2 * | 8/2006 | Adjaoute | 726/25 |
| 7,246,740 B2 * | 7/2007 | Swift et al. | 235/379 |
| 7,263,506 B2 * | 8/2007 | Lee et al. | 705/38 |
| 7,313,545 B2 * | 12/2007 | Degen et al. | 705/39 |
| 7,562,814 B1 * | 7/2009 | Shao et al. | 235/380 |
| 7,603,331 B2 * | 10/2009 | Tuzhilin et al. | 706/45 |
| 7,761,379 B2 | 7/2010 | Zoldi | |
| 7,793,835 B1 * | 9/2010 | Coggeshall et al. | 235/380 |
| 7,925,607 B2 * | 4/2011 | Kerley et al. | 706/47 |
| 7,984,500 B1 * | 7/2011 | Khanna et al. | 726/22 |
| 7,991,689 B1 * | 8/2011 | Brunzell et al. | 705/38 |
| 8,020,763 B1 * | 9/2011 | Kowalchyk et al. | 235/380 |
| 2001/0032192 A1 * | 10/2001 | Putta et al. | 705/76 |
| 2002/0120846 A1 * | 8/2002 | Stewart et al. | 713/168 |
| 2002/0133721 A1 | 9/2002 | Adjaoute | |
| 2003/0074471 A1 * | 4/2003 | Anderson et al. | 709/245 |
| 2003/0187783 A1 * | 10/2003 | Arthus et al. | 705/39 |
| 2004/0039686 A1 * | 2/2004 | Klebanoff | 705/38 |
| 2004/0111305 A1 * | 6/2004 | Gavan et al. | 705/7 |
| 2005/0039036 A1 * | 2/2005 | Eisen | 713/193 |
| 2005/0043961 A1 * | 2/2005 | Torres et al. | 705/1 |

(Continued)

OTHER PUBLICATIONS

Warning Bells & "The Bust-Out"; Cowie, Norman E.; Business Credit, Jul. 1, 2000; 3-pages.*

(Continued)

*Primary Examiner* — Gregory Johnson
(74) *Attorney, Agent, or Firm* — Treyz Law Group; Nancy Y. Ru

(57) ABSTRACT

A fraud detection engine is provided that analyzes transactions for fraudulent transactions. The transactions may include credit card or debit card transactions. The fraud detection engine may identify possible sources of fraud. The fraud detection engine may identify possible phony acceptors that masquerade as genuine merchants. The fraud detection engine may identify compromising points where accounts become compromised and are prone to fraudulent transactions thereafter. The fraud detection engine may receive and analyze transaction data in real-time or in batch mode. The fraud detection engine may use fuzzy logic. The fraud detection engine may use artificial intelligence such as case-based reasoning or business rules.

17 Claims, 4 Drawing Sheets

U.S. PATENT DOCUMENTS

| | | | |
|---|---|---|---|
| 2005/0084083 A1* | 4/2005 | Lawyer et al. | 379/114.14 |
| 2005/0091524 A1* | 4/2005 | Abe et al. | 713/200 |
| 2005/0160280 A1* | 7/2005 | Caslin et al. | 713/189 |
| 2005/0190905 A1* | 9/2005 | Bolt et al. | 379/189 |
| 2005/0278550 A1* | 12/2005 | Mahone et al. | 713/189 |
| 2006/0149674 A1* | 7/2006 | Cook et al. | 705/44 |
| 2006/0236395 A1* | 10/2006 | Barker et al. | 726/23 |
| 2007/0084912 A1* | 4/2007 | Davis | 235/380 |
| 2007/0106582 A1* | 5/2007 | Baker et al. | 705/35 |
| 2007/0112667 A1* | 5/2007 | Rucker | 705/38 |
| 2007/0203732 A1* | 8/2007 | Griegel et al. | 705/1 |
| 2008/0040275 A1* | 2/2008 | Paulsen et al. | 705/44 |
| 2008/0109392 A1* | 5/2008 | Nandy | 706/47 |
| 2008/0172316 A1* | 7/2008 | Adams | 705/35 |
| 2008/0203170 A1* | 8/2008 | Hammad et al. | 235/492 |
| 2008/0253645 A1* | 10/2008 | Nauck et al. | 382/159 |
| 2008/0283596 A1 | 11/2008 | Ishida | |
| 2009/0012896 A1* | 1/2009 | Arnold | 705/39 |
| 2009/0099959 A1* | 4/2009 | Liao et al. | 705/38 |
| 2009/0132347 A1* | 5/2009 | Anderson et al. | 705/10 |
| 2009/0210444 A1* | 8/2009 | Bailey et al. | 707/103 R |
| 2010/0005013 A1* | 1/2010 | Uriarte | 705/30 |
| 2010/0076890 A1* | 3/2010 | Low et al. | 705/44 |
| 2010/0094791 A1* | 4/2010 | Miltonberger | 706/46 |
| 2010/0106611 A1* | 4/2010 | Paulsen et al. | 705/26 |
| 2010/0145836 A1 | 6/2010 | Baker | |
| 2010/0169163 A1* | 7/2010 | Alvin | 705/10 |
| 2010/0191661 A1* | 7/2010 | Pritchett et al. | 705/318 |
| 2010/0223164 A1* | 9/2010 | Fortier et al. | 705/30 |
| 2010/0228656 A1* | 9/2010 | Wasserblat et al. | 705/35 |
| 2011/0022483 A1* | 1/2011 | Hammad | 705/17 |
| 2011/0173116 A1* | 7/2011 | Yan et al. | 705/38 |
| 2012/0101927 A1* | 4/2012 | Leibon et al. | 705/35 |

OTHER PUBLICATIONS

Tackling the Issue of Bust-Out Fraud; Retail Banker International; Jul. 24, 2007; 5-pages.*

Montague, David. "Essentials of Online Payment Security and Fraud Prevention." John Wiley & Sons, Inc., Hoboken, New Jersey, 2011. pp. 122-124.

Adjaoute, Akli, "Responding to the e-Commerce Promise with Nonalgorithmic Technology." pp. F2-1 to F2-16 of "Handbook of E-Business." edited by Jessica Keyes. RIA/WG&L 2000.

* cited by examiner

SYSTEMS AND METHODS FOR ADAPTIVE IDENTIFICATION OF SOURCES OF FRAUD

BACKGROUND

This invention relates to fraud detection, and more particularly, to analyzing and identifying sources of fraud in real time.

Transactions made with payment cards such as credit cards, prepaid cards, debit cards, and smart phones, can be susceptible to fraud. There are many possible types of fraud. In one type of fraud, a phony merchant may initially (dormant period) masquerade as a genuine merchant and then suddenly begin making many fraudulent transactions using all the previous cards that visited that merchant. In other types of fraud, payment cards or account information may be stolen. Fraudulent transactions may occur on the account after the card has visited a root of compromised accounts (acceptor).

Payment card issuers, such as banks and other financial institutions are often motivated to detect and stop fraudulent transactions. The most costly way is when the card issuer learns of the fraudulent transactions only when it is reported by a cardholder. However, there may be a delay between the time a fraudulent transaction occurs and when it is noticed and reported by the cardholder. Meanwhile, the source of fraudulent transaction may continue to compromise that account and other cardholders' accounts.

It would be desirable to provide a way to rapidly stop fraudulent transactions and identify in real-time the root/sources of compromised accounts as well as phony merchants.

SUMMARY

A system is provided that analyzes in real-time, inputs from four sources:
1) Scores with high threshold received from various real-time TCP Transaction Servers (TTS).
2) The abnormal activities received from various real-time velocity servers.
3) The patterns from various real-time profiling servers.
4) External sources: flat files, databases, to detect the root of compromising and phony merchants.

The engine will also have access to information from the profiling servers related to:
1) Type of merchant or card or bin or any combination of these fields.
2) Number of transactions for a card in the last 30, 60, 90, 365 days, or other suitable time intervals.
3) Average amount spent by a card on groceries, books, electronic, or other categories in any previous time interval.
4) Number of cross border travels in the last year.
5) Average purchase amount at that merchant over the last week or other suitable time interval.
6) Number of declined cards at that merchant over the last week or other suitable time interval.
7) Number of high scored transactions at that merchant over the last week or other suitable time interval.
8) Number of cards that visited the merchant and then become fraudulent.
9) Average cash-back amount at that merchant over the 90 days, or other suitable time interval.

A real-time fraud detection engine may be implemented on computing equipment. The fraud detection engine may receive data from transactions over a communications network. The transactions may include genuine and fraudulent transactions.

The real-time fraud detection engine may use smart-agents, Data Mining, Neural network, Business Rules, fuzzy logic, case-based reasoning, optimization, and genetic algorithms. The real-time fraud detection engine may analyze in real-time scores with a high threshold received from various servers such as a TCP Transaction Server, inputs from various velocity servers, as well as patterns received from various profiling servers to identify the possible root of compromised accounts.

The real-time fraud detection engine may also provide a list of possible phony merchants. Phony merchants may masquerade as genuine merchants and conduct fraudulent transactions even if initially (during a dormant period) they act as genuine merchants. The real-time fraud detection engine may provide a list of possible compromising points. A compromising point may be the point at which a cardholder's account compromised or stolen. A compromising point may be a merchant, terminal, website, etc. A fraud detection engine may analyze transactions data in real-time and provide dynamically updated lists of phony merchants and compromising points. A fraud detection engine may also operate in batch mode.

Further features of the invention, its nature and various advantages will be more apparent from the accompanying drawings and the following detailed description of the preferred embodiments.

DETAILED DESCRIPTION

Figure 1:
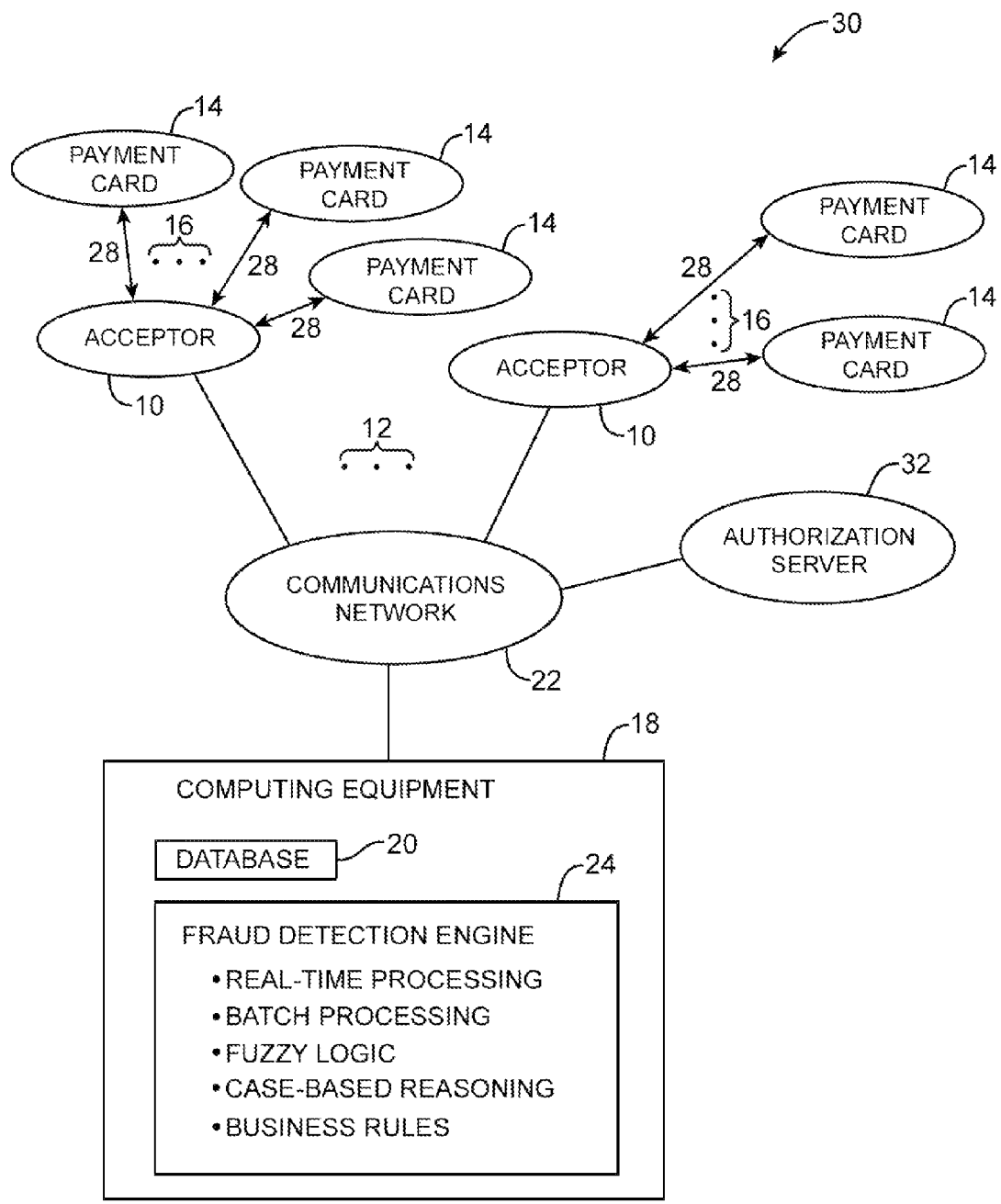
FIG. 1 is a diagram of an illustrative transaction system having a fraud detection engine in accordance with an embodiment of the present invention.

This is related to detecting fraudulent transactions and sources of fraud.

Transactions may include transactions made using payment cards such as credit cards, prepaid cards, debit cards, charge cards, stored-value cards, consumer or corporate cards, gift cards, or other types of payment cards. Payment cards may display account information, such as an account number, expiration date, or security card. Payment cards may also store information. Payment cards may be magnetic stripe cards, smart card, or proximity cards. Payment cards may have associated accounts and users (also known as cardholders). Transactions may also be made on accounts that do not have payment cards. Transactions on an account with a payment card may also be conducted with the physical card, such as in a transaction made over the internet or in a phone call or by mail.

Payment cards and associated accounts may be issued by a financial institution such as a bank or credit card company. The payment card issuer may be known as a card-issuing bank. The card-issuing bank may belong to a credit card association such as Visa or Mastercard.

A transaction may take place between a user (also known as a cardholder) and a merchant (also known as an acceptor). A typical transaction may consist of a payment. A customer may make a payment to a merchant in exchange for goods or services. Other types of transactions may include refunds (also known as credits).

A merchant may have a merchant account at a bank known as an acquiring bank, or acquirer. During a transaction, an acquiring bank may verify the cardholder's account and payment amount with the card-issuing bank. The card-issuing bank may pay the acquiring bank. The acquiring bank may place deposits into a merchant's account at the acquiring bank.

A payment card need not be physically present in order to make a transaction on an account. For example, credit card information may be recited over the phone to make a purchase. Payment card information may also be entered into a website when making an online transaction. Such transactions may be known as card not present (CNP) transactions.

Payment cards may be vulnerable to many different types of fraud.

In one type of fraud, a phony merchant (also known as a phony acceptor) may masquerade as an authentic merchant. For example, a fraudster may create a website that appears to sell or offer genuine goods and services, but may in fact be a front for fraudulent transactions.

In one type of fraud, a payment card may be stolen, or payment card information may be stolen although the cardholder maintains physical possession of the payment card. For example, a store or restaurant may have a dishonest employee that records credit card information in the course of conducting an authentic transaction. In another example, fraudsters may attach devices known as "skimmers" to ATMs (automatic teller machines) or to gas station fuel pumps that surreptitiously record information from payment cards. Payment card information may also be surreptitiously stolen during online transactions on the internet. Stolen card information may be collected by thieves who then sell the information to others who perpetrate the fraudulent transactions. In this type of fraud, a payment card may be compromised long before any fraudulent transaction has occurred on the account. The point at which a payment card is compromised may be known as a compromising point. The compromising point may be a merchant or may be located at a merchant.

Once a fraudulent transaction has occurred, it might be some time before a cardholder notices that their account has been compromised. For example, a cardholder might not notice a fraudulent transaction on their credit card statement. A fraudulent transaction might deliberately be for a small amount in order to escape notice. As a result, significant time may elapse between a fraudulent transaction and when a user reports the fraudulent transaction to a bank or payment card issuer. In the meantime, other cardholders' accounts may be compromised by the same phony merchant, or at the same compromising point.

It may therefore be advantageous to detect fraudulent transactions before they are reported by the cardholder. It may also be advantageous to identify possible sources of fraudulent transactions so that other cardholders' accounts may be protected.

FIG. 1 is a diagram of an illustrative transaction system that may be provided with fraud detection.

Transaction system 30 of FIG. 1 may have acceptors 20 that accept transactions 28 with payment cards 14. Transaction system 30 may have any suitable number of acceptors 10, as indicated by dots 12. Acceptors 10 may also be known as merchants. Each acceptor 14 may conduct transactions with any suitable number of payment cards 14, as indicated by dots 16. Payment cards 14 may as credit cards, debit cards, or other payment cards. Payment cards 14 may also be known as payment accounts. Payment accounts need not have an associated card. Transactions 28 involving payment cards 14 need not involve the presence of a physical card, as transactions 28 may be conducted using account information from payment cards 14.

Acceptors 10 may communicate through communications network 22 with an authorization server such as authorization server 32. Authorization server 32 may authorize transactions 28. Authorization server 32 may belong to a card-issuing bank or an acquiring bank. Authorization server 32 may be part of a credit card network such as Visa or Mastercard. Communications network 22 may be a secure communications network.

Computing equipment 18 may receive data associated with transactions 28 through communications network 22. Computing equipment 18 may receive transaction data from authorization server 32 through communications network 22. Computing equipment 18 may have one or more databases such as database 20. Computing equipment 18 may have a fraud detection engine such as fraud detection engine 24. Computing equipment belong to a financial institution such as a card-issuing bank. Computing equipment may belong to a third-party that analyzes transaction data in order to detect fraud for a card-issuing bank.

Fraud detection engine 24 may process transaction data in order to detect fraudulent transactions and identify sources of fraud. Fraud detection engine 24 may process transaction data in real-time. Fraud detection engine 24 may also be configured to process transaction data in batches. Fraud detection engine 24 may use fuzzy logic to analyze transaction data. Fraud detection engine 24 may use artificial intelligence such as smart agents, case-based reasoning, data mining, neural network, optimization, or expert systems to analyze transaction data.

Figure 2:
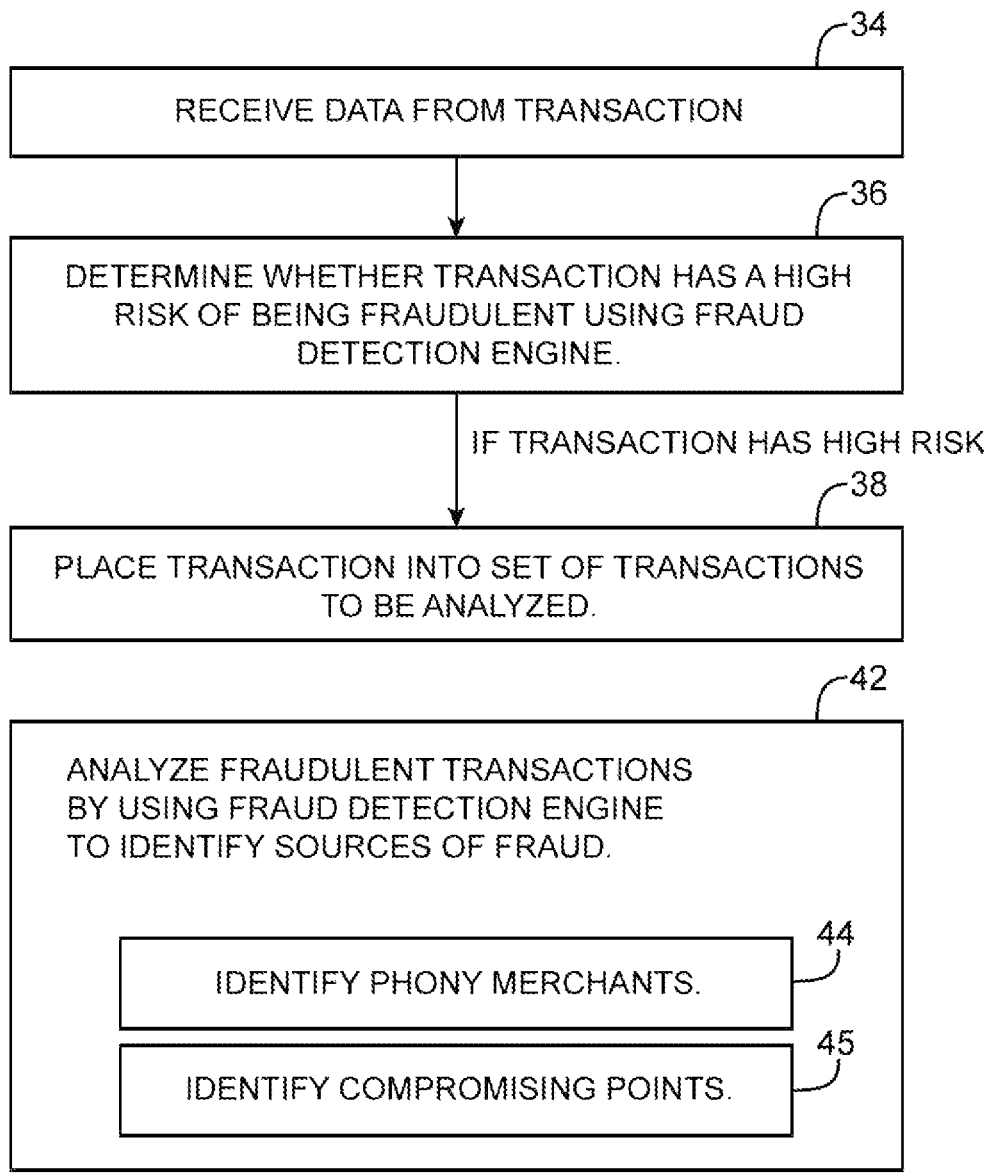
FIG. 2 is flow chart showing steps used in real-time fraud detection in accordance with an embodiment of the present invention.

Fraud detection engine 24 may analyze transaction data in real-time using steps as shown in FIG. 2. In step 34, fraud detection engine 24 may receive data from a transaction. Data from a transaction may include cardholder account information, merchant account information, and payment information such as date, time, and amount. Transaction data from both genuine and fraudulent transactions may be received by fraud detection engine 24. Fraudulent transactions may form a fraction of the total transactions. Data may be received from approved transactions and unapproved transactions.

In step 36, fraud detection engine 24 may determine whether a transaction has a high risk of being fraudulent. Fraud detection engine 24 may compare each transaction with a cardholder's past history or an acceptor past history to determine which transactions appear abnormal. Qualities about a transaction such as the amount, date, time, and type (e.g., restaurant, online, etc.) may be considered when determining whether a transaction may be a fraudulent transaction.

Fuzzy logic may be used to determine whether a transaction may be fraudulent. For example, each transaction's risk of being fraudulent may be stored as a fuzzy attribute (e.g., a transaction's risk of being fraudulent may fuzzy values such as "low risk", "medium risk", or "high risk." Transactions may also be labeled as "genuine" and "fraud," or "abnormal," "suspicious," and "normal." Artificial intelligence technologies may be used to detect fraudulent transactions. Smart agents, case-based reasoning, data mining, neural network, and optimization may be used to determine whether a transaction may be fraudulent. Expert systems (also known as business rules) may also be used to determine whether a transaction may be fraudulent.

If a transaction has a high risk of being fraudulent, the transaction may be said to be a fraudulent transaction. That transaction may be placed in a pool of high-risk transactions that may undergo further analysis, as shown in step 38.

The steps of receiving transaction data 34, determining a transaction's risk of being fraudulent in step 36 and placing high-risk transactions in a pool to be analyzed in step 38 may be conducted in real-time or in batch mode. When fraud detection engine 24 performs these steps in real-time, fraud detection engine 24 may continuously receive new transaction data, and dynamically update a list of high-risk (or suspicious) transactions. If fraud detection engine 24 is configured to operate in batch mode, fraud detection engine 24 may, for example, analyze transactions for high-risk transactions at intervals of time, e.g., daily, weekly, bimonthly, etc. Fraud detection engine 24 may also be configured to perform some processes in real-time and other processes in batch mode.

Transaction data may be also be used to determine whether some cards (or accounts) have been compromised. For example, if a large number of fraudulent transactions have occurred on a card, that card might be said to be a compromised or fraudulent card. The risk at which a card might be fraudulent may be stored as a fuzzy value.

Fraudulent transactions may be analyzed by fraud detection engine to determine sources of fraud, as shown in step 42. Fraud detection engine 24 may analyze fraudulent transactions to determine if multiple fraudulent transactions occurred at the same acceptor. Such an acceptor may be a phony merchant. Fraud detection engine 24 may determine whether fraudulent transactions occurred on multiple accounts in which the cardholders had previously visited the same merchant. Such a merchant may be a compromising point.

Fraud detection engine 24 may analyze fraudulent transactions in order to detect patterns of fraud. Fraud detection engine 24 may identify possible sources of fraud, as shown in step 42 of FIG. 2. Fraud detection engine 24 may identify possible phony merchants, as shown in step 44. The risk that a merchant might be a phony merchant may be indicated by a fuzzy value. For example, a merchant may be labeled as "genuine," "suspicious," "normal," or any suitable fuzzy value. A value that indicated whether a merchant is fraudulent may also be referred to as a score.

Fraud detection engine 24 may identify potential compromising points, as shown in step 45. The likelihood that an acceptor may be a compromising acceptor may be indicated by a fuzzy value such as "genuine," "suspicious," "normal," or any suitable fuzzy value.

If desired, fraud detection engine 24 may also analyze transaction data to identify other types of fraud sources.

Fraud detection engine 24 may perform the analysis of step 42 in real-time. When fraud detection engine 24 is configured to operate in real-time, fraud detection engine 24 may dynamically extract a list of phony acceptors in step 44. Fraud detection engine 24 may dynamically extract a list of compromising points in step 45. Fraud detection engine 24 may assign scores to acceptors that indicate the likelihood that acceptors may be compromising phony.

When fraud detection engine 24 is operated in real-time, results for possible compromising acceptors and phony merchants may be updated very frequently, e.g., every 5 minutes or less, every 2 minutes or less, etc. Fraud detection engine 24 may process a large number of transactions in a short period of time. For example, fraud detection engine 24 may process data from millions of cards or billions of transactions with a response time less than 50 milliseconds.

Fraud detection engine 24 may also operate in batch mode. In batch mode, fraud detection engine 24 may perform analyses in intervals of every week, every two weeks, etc. Fraud detection engine 24 may also perform some analyses in real-time and some analyses in batch mode.

Fraud detection engine 24 may use fuzzy logic. Fraud detection engine 24 may use fuzzy objects having fuzzy attributes.

Figure 3:
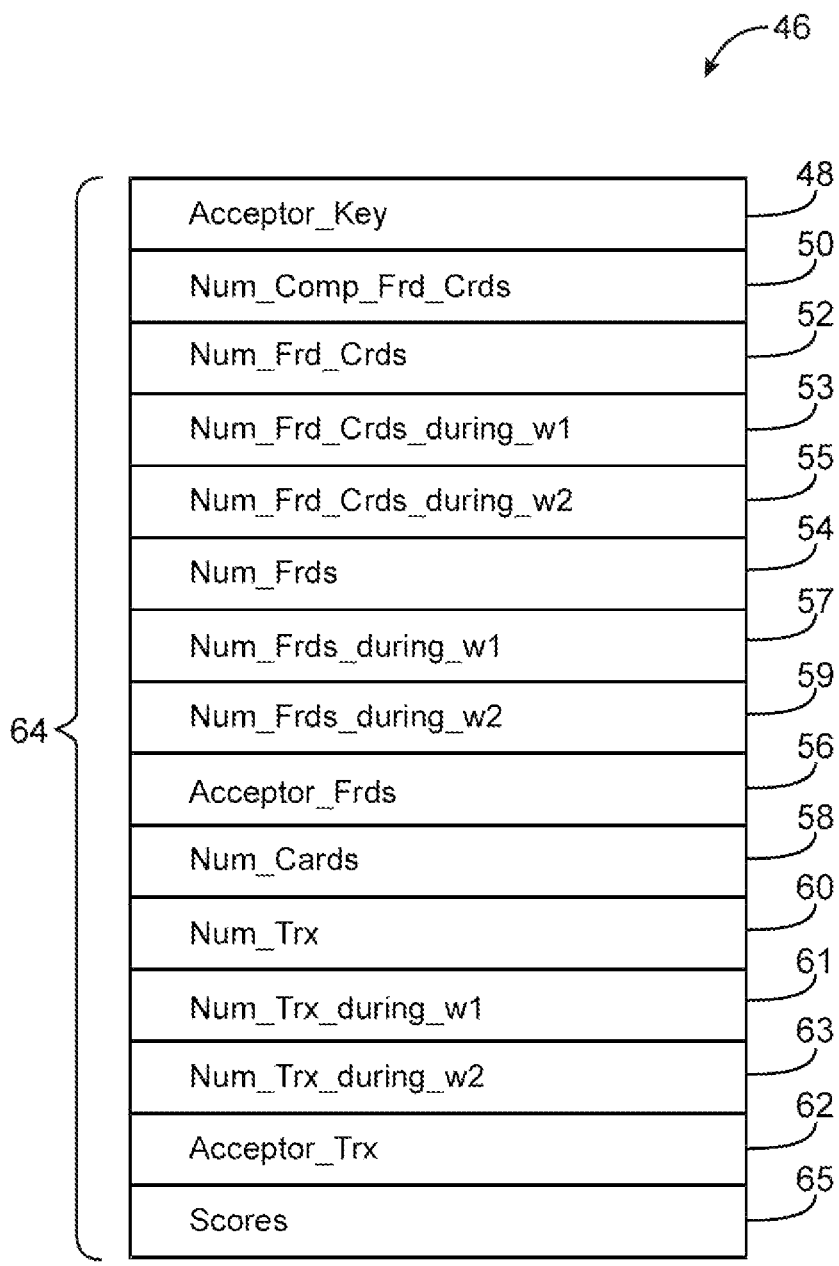
FIG. 3 is an illustrative fuzzy object that may represent information about an acceptor in accordance with an embodiment of the present invention.

FIG. 3 is a diagram of an illustrative fuzzy object that may be used for each acceptor. Acceptor object 46 may be identified by an acceptor key such as Acceptor_Key 48. Acceptor object 46 may have attributes 64. Attribute 50, Num_Comp_Frd_Cards, may represent the number of cards that experienced a first fraudulent transaction after conducting a transaction with this acceptor. A visit to this acceptor may be required to occur within a specified time window before the first fraudulent transaction. The time window may be adjustable depending on the desired depth of analysis.

Attribute 52, Num_Frd_Crds, may represent the number of cards that experienced a fraudulent transaction either before or after a transaction with this acceptor. Num_Frd_Crds_during_w1 53 may represent a number of accounts on which an approved fraudulent transaction takes place within a specific time period known as window of time 1. A visit to this acceptor can take place after the first fraud on an account, as long as a fraudulent transaction occurs within the window of time 1 following the visit. Num_Frd_Crds_during_w2 55 may represent a number of accounts on which an approved fraudulent transaction takes place within another time period known as window of time 2.

Attribute 54, Num_Frds, may represent the number of fraudulent transactions that occurred on cards following a transaction with this acceptor. Num_Frds_during_w1 57 may represent the total number of approved fraudulent transactions that take place within a specific time period—known as window of time 1—after a visit to the acceptor. The visit may take place before or after the first fraud on an account. Num_Frds_during_w2 59 may represent the total number of approved fraudulent transactions that take place within another specific time period—known as window of time 2—after a visit to the acceptor.

Attribute 56, Acceptor_Frds, may represent the number of approved fraudulent transactions that occurred at this acceptor. Any fraudulent transaction at any point in time may be counted.

Num_Cards 58 may represent the total number of cards on which this acceptor appears in an approved transaction. Num_Cards may be computed on both genuine and fraudulent cards. Num_Cards may include only approved fraudulent transactions.

Attribute 60, Num_Trx, may represent the number of transactions that have occurred on cards following transactions at this acceptor, including transactions at other acceptors. Num_Trx may be computed on both genuine and fraudulent cards, and may count both fraudulent and genuine transactions. Num_Trx_during_w1 61 may represent the number of transactions that took place within specific time period, known as window of time 1, following a visit to this acceptor. Num_Trx_during_w2 63 may represent the number of transactions that took place within another time period, known as window of time 2, following a visit to this acceptor.

Attribute 62, Acceptor_Trx, may represent the number of transactions that have occurred at this acceptor. Attributes 64 in FIG. 3 may be fuzzy attributes. Acceptor_Trx may count both fraudulent and genuine transactions.

Each acceptor may be given a score, such as Scores 65 in FIG. 3. Score 65 may indicate the likelihood of an acceptor being phony, compromising or otherwise fraudulent. Score 65 may be a fuzzy attribute. For example, a card may have a score of "low," "medium," or "high" risk. When fraud detection engine 24 is performing real-time analysis of incoming transaction data, Score 65 may be increased if instances of fraudulent transactions are found to occur at the acceptor, or if fraudulent transactions occur after a visit to the acceptor. The score may be also known as a similarity. There may be one or more scores 65. Each acceptor may have one score indicating its risk of being a phony acceptor and another score indicating its risk of being a compromising point. Acceptors may have any suitable number of scores.

Each card or account 14 may be stored in an associated fuzzy object. An object for a card might have such attributes as account number, name of user, number of fraudulent transaction, geographical data, spending patterns, types of purchases (such as online purchases or purchases made in brick and mortar stores), frequencies of specific merchant categories (in categories such as gas stations, restaurants, etc, as indicated by a merchant category code (MCC). These attributes may be fuzzy attributes. Each card may also have an associated score that indicated the likelihood of the card being compromised. Such a score may be a fuzzy score. For example, a card may have a score of "low," "medium," or "high" risk. A card may also be scored as "normal," "abnormal," "suspicious," or any suitable value.

Each transaction 28 may be stored in an associated fuzzy object. A transaction object may have attributes such as time and date, amount, merchant category code (MCC), location, acceptor identification information, acquirer identification information (such as an acceptor's bank). These attributes may be fuzzy attributes. For example, time may be a fuzzy attribute that may indicate whether or not a transaction occurred during business hours. A time fuzzy attribute may take into account fuzziness in business hours—for example, sometimes business hours could be considered to end sometimes at 5 pm and sometimes at 6 pm. Each transaction 28 may have a score that may be stored as a fuzzy attribute of the transaction object. The score may indicate the likelihood of the transaction being fraudulent.

Fuzzy objects for acceptors, cards, and transactions may be stored in a database such as database 20 of FIG. 1. Transaction data may be stored in database 20.

Fraud detection engine 24 may use artificial intelligence such as case-based reasoning and expert systems.

Case-based reasoning is a process of solving new problems based on the solutions of similar past problems. Fraud detection engine 24 may identify sources of fraud based on a history of how sources of fraud were identified in the past.

Expert systems may also be known as business rules. Expert systems may have rules that consist of "IF-THEN" clauses. Fraud detection engine 24 may use such rules to decide whether an acceptor is a compromising acceptor. For example, an acceptor that processes 10,000 transactions, out of which 100 are determined to be fraudulent transactions, might be considered to be a genuine acceptor. On the other hand, an acceptor that processes 250 transactions, out of which 100 are fraudulent transactions, might be considered to be a phony merchant. Business rule may be fuzzy business rules.

In order to extract a list of phony acceptors, such as in step 44 of FIG. 2, fraud detection engine 24 may compute a fraud risk for each acceptor using fuzzy logic and fuzzy values. The fraud risk may be primarily based on a number or rate of fraudulent transactions that occurred at each acceptor, but may be enhanced based on other attributes. The fraud risk may be a score such as score 65 of FIG. 3. The computation of fraud risk may be performed by a method known as GetRisk( ). After the fraud risk has been computed for the acceptors, the riskiest acceptors may be considered to be on a list of phony acceptors. The fuzzy objects may collaborate to produce this list. Assessing the riskiest acceptors may be performed by a method known as AssessRisk( ).

In order to extract a list of compromising acceptors, such as in step 45 of FIG. 2, a fraud risk of acceptors may be computed that is primarily based on a rate of fraudulent transactions that occur on a card after a visit to each acceptor. The rate of fraudulent transactions may be a fuzzy attribute. Such a fraud risk may be a score such as one of scores 65 of FIG. 3. The computation of such a fraud risk may be a performed by a method, which may be called GetRiskCardAfter( ). One the risk levels have been computed, the fuzzy objects collaborate so that the compromising acceptors emerge. This step may be performed by another method, which may be called AssessRisk( ).

Once lists of compromising accepters and phony merchants are produced, actions may be taken against these accepters. Cardholders that have visited those acceptors may be warned, or cards that have visited those acceptors may be refused at future transactions. A suspicious pool of cards may be provided to a credit card processor such as Visa or Mastercard, or to a bank or financial institution that issues the cards.

Fraud detection engine 24 may perform some analyses in real-time and other analyses in batch mode. For example, fraud detection engine 24 may assess in real time an authorization request submitted by an authorization server of an acquirer. Fraud detection engine 24 may inform the authorization server in real time whether the authorization request of a given transaction should be authorized.

Fraud detection engine 24 may have a portion, also known as a model, that operates in real-time and a portion that operates in batch mode. Fraud detection engine 24 may have a batch mode model that provides, e.g., a black list of acceptors, list of high risk merchants, a list of phony merchants, or other information to a real-time model that assesses transaction authorization requests in real-time.

Fraud detection engine 24 may also receive and analyze transaction data that includes fallback methods, credit transactions such as refunds and merchant authorization reversals, transactions conducted at high-risk merchants, personal account number (PAN) key-entry transactions that exceed typical ratios, abnormal business hours, abnormal seasons, abnormal amounts, inactive merchants, volume of declined transactions and their type (i.e. invalid CVC—card verification code, insufficient funds, etc.), inconsistent authorization and clearing data elements for the same transactions. Fraud detection engine 24 may monitor any desired transaction data for suspicious activity.

Fraud detection engine 24 may monitor merchant authorization requests in real-time and provide real-time alerts based on suspicious activity. Such activity may include a number of authorization requests that are determined to be riskier than a certain threshold. The threshold may be set by the acquirer for that merchant. Fraud detection engine 24 may monitor a ratio of card present to card not present transactions that are determined to be riskier than a certain threshold set by the acquirer for that merchant. Fraud detection engine 24 may monitor a ratio of PAN key entry transactions to non-PAN transactions that are determined to be riskier than a certain threshold set by the acquirer for that merchant. Fraud detection engine 24 may monitor repeated authorization requests for the same amount or the same account. Fraud detection engine 24 may monitor for an increased number of authorization requests compared to the normal activity for a merchant. Fraud detection engine 24 may monitor for an unusual fallback transaction volume. Such behavior may indicate that a merchant may be a phony merchant.

Fraud detection engine 24 may monitor increases in merchant deposit volume, increases in a merchant's average ticket size and number of transactions per deposit, change in frequency of deposits, frequency of transactions on the same cardholder account, including credit transactions, unusual numbers of credits, or credit dollar volume, exceeding a level of sales dollar volume appropriate to the merchant category, and large credit transaction amounts, significantly greater than the average ticket size for the merchant's sales. Such behavior may indicate that a merchant may be a phony merchant. Fraud detection engine 24 may monitor these behaviors in real-time and provide real-time alerts to an acquirer.

Fraud detection engine 24 may compare daily deposits from transactions into an acquirer's account at an acquirer's bank and compare against average numbers of transactions and transaction amounts. The average may be taken over a certain period of time, e.g., of 90 days or any suitable period of time. Unusual number of transactions or transaction amounts may indicate suspicious behavior for by the acquirer. For example, suspicious behavior may be considered to be 150% of the average number of transactions or 150% of the usual transactions amounts.

Fraud detection engine 24 may compare average number of transactions and transaction amounts for new merchants with other merchants in the same merchant category code. Unusual number of transactions or transaction amounts may indicate suspicious behavior for by the merchant. For example, suspicious behavior may be considered to be 150% of the average number of transactions or 150% of the usual transactions amounts.

Fraud detection engine 24 may analyze, in real-time, inputs from four sources:
1) Scores with high threshold received from various real-time TCP Transaction Servers (TTS).
2) The abnormal activities received from various real-time velocity servers.
3) The patterns from various real-time profiling servers
4) External sources: flat files, databases, to detect the root of compromising and phony merchants.

The engine will also have access to information from the profiling servers related to:
1) Type of merchant or bin or card ATM or any combination of these fields.
2) Number of transactions for a card in the last 30, 60, 90, 365 days, or other suitable time intervals.
3) Average amount spent by a card on groceries, books, electronic, or other categories in any previous time interval.
4) Number of travels in the last year.
5) Average purchase amount at that merchant over the last week or other suitable time interval.
6) Number of declined cards at that merchant over the last week or other suitable time interval.
7) Number of true fraud at that merchant over the last week or other suitable time interval.
8) Number of cards that visited the merchant and then become fraudulent.
9) Average cash-back amount at that merchant over the 90 days, or other suitable time interval.

The velocity servers and profiling servers will send to the engine all the abnormal activities as described previously.

Transactions that have a risk score that is higher than a certain threshold may be further analyzed. The analysis may be performed at intervals, e.g., every night, every hour, every week, or other suitable interval. The high-risk transactions may be analyzed to determine whether the corresponding cardholder accounts had previously visited a common acceptor. If a number of cardholder accounts had visited a common acceptor, the common acceptor may have been a compromising point for those accounts. The transactions conducted at the common acceptor may or may not have been fraudulent transactions.

Acceptors may be given a score that represents the risk that the acceptor is a compromising acceptor. The high-risk transactions may be further analyzed to determine what type of fraud occurred at the common acceptor. For example, the fraud may be skimming fraud, where card information is copied. If the fraud that has occurred at a common acceptor is determined to be skimming fraud, that acceptor may be given a higher score than if the fraud is determined to be of another type. Acceptors that have a score that is higher than a certain threshold may be placed on a black list of acceptors.

Cardholder accounts that have previously visited an acceptor on the black list of acceptors may be place on a list of high-risk cardholder accounts. These cardholder accounts may or may not have experienced a fraudulent transaction.

Fraud detection engine 24 may monitor merchant authorization requests in real-time. For each authorization request, fraud detection engine 24 may compare the request with the list of high-risk cardholder accounts and the black list of acceptors. If the authorization request is received from an acceptor on the black list of acceptors, the transaction may be assigned a higher risk score. If the authorization request is on a cardholder account on the list of high-risk cardholder account, the transaction may be assigned a higher risk score. Transactions that have scores above a certain threshold may be denied.

Authorization requests that are received from acceptors on the black list of acceptors may have their associated cardholder accounts placed on the list of high-risk cardholder accounts.

Fraud detection engine 24 may help determine the type of acceptors that are most easily compromised. Such information may be useful to credit card associations such as Visa or MasterCard, or to credit card issuers such as banks.

Figure 4:
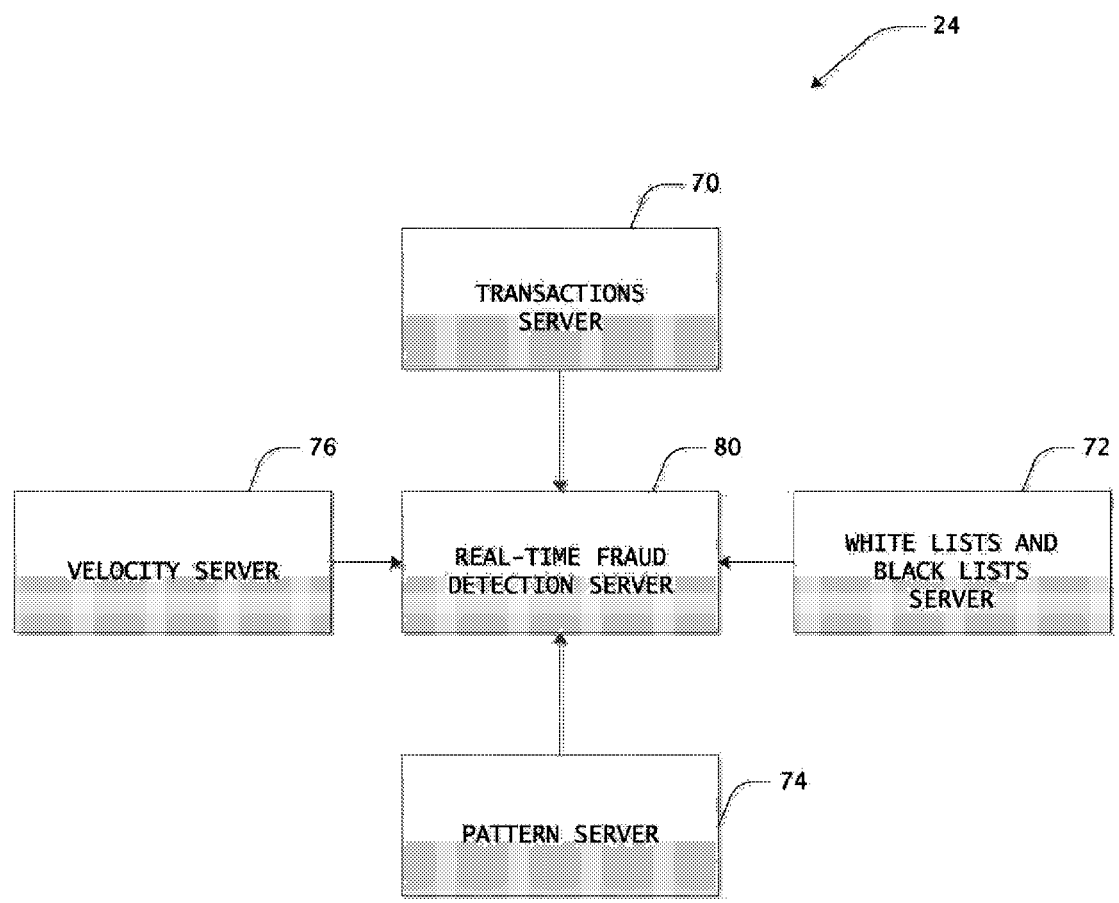
FIG. 4 is a diagram of an illustrative fraud detection engine implemented on a distributed architecture in accordance with an embodiment of the present invention.

Fraud detection engine 24 may be implemented using a distributed architecture as shown in the example of FIG. 4. Using a distributed architecture may result in better performances using entry level computing equipment (such as personal desktop computers) rather than costly mainframe computers or other specialized hardware. A fraud detection engine implemented on a distributed architecture may also result in a system that is resilient to disruption. Fraud detection engine 24 may also be known as fraud detection system.

In the example of FIG. 4, fraud detection engine 24 may have a central server such as real time fraud detection server 80. Server 80 may detect the sources (also known as roots) of compromised accounts in real time. Server 80 may receive inputs from other servers 70, 72, 74, and 76.

Transactions server 70 may score live transactions in real time. Transactions server 70 may be a TCP server. Transactions server 70 may identify transactions that have a high score and are likely to be fraudulent and, in real time, send those transactions to server 80.

Velocity server 76 may analyze the behavior of merchants during given time periods such as the previous day, week, month, or other suitable time period. Velocity server 76 may identify any abnormal behavior by merchants. Velocity server 76 may provide analysis results to server 80.

Pattern server 74 may analyze the transactions to identify patterns such as patterns in the average transactions per month for each merchant or the number of transaction of a given transaction type for each merchant.

Server 72 having white lists and black lists may provide such lists to server 80.

The distributed architecture of FIG. 4 is merely an example. Fraud detection system 24 may be implemented on any suitable number of servers. For example, fraud detection system 24 may be implemented on two servers, three servers, four servers, five servers or more, or any suitable number of servers.

The foregoing is merely illustrative of the principles of this invention and various modifications can be made by those skilled in the art without departing from the scope and spirit of the invention.

What is claimed is:

1. A method for using a fraud detection engine on a computing system, comprising:
at the fraud detection engine on the computing system, receiving transaction data from transactions between cardholder accounts and acceptors; and
with the fraud detection engine on the computing system, analyzing transaction data using fuzzy logic, comprising:
identifying, with fuzzy logic, transactions that have a high risk of being fraudulent, wherein identifying the transactions that have a high risk of being fraudulent comprises identifying in real-time the transactions that have a high risk of being fraudulent;
if a transaction has a high risk of being fraudulent, placing the transaction in a set of high-risk transactions to be analyzed; and
identifying sources of fraudulent transactions by analyzing the transactions in the set of high-risk transactions, wherein identifying the sources of fraudulent transactions comprises identifying the sources of fraudulent transactions in batch mode and wherein the computing system has a distributed architecture.

2. The method defined in claim 1, wherein identifying the sources of fraudulent transactions comprises:
identifying phony acceptors, wherein phony acceptors comprise acceptors that have a high rate of fraudulent transactions.

3. The method defined in claim 2, wherein identifying the sources of fraudulent transactions further comprises:
identifying compromising acceptors, wherein cardholder accounts that have had transactions with compromising acceptors have a higher rate of future fraudulent transactions.

4. The method defined in claim 1, wherein analyzing the transaction data using fuzzy logic further comprises analyzing transaction data in real-time using fuzzy logic.

5. The method defined in claim 1, wherein analyzing the transaction data using fuzzy logic further comprises analyzing transaction data using case-based reasoning.

6. The method defined in claim 1, wherein analyzing the transaction data using fuzzy logic further comprises analyzing transaction data in batch mode using fuzzy logic.

7. The method defined in claim 1, wherein identifying the transactions that have a high risk of being fraudulent comprises:
determining each transaction's risk of being a fraudulent transaction; and
assigning a fuzzy value to each transaction that indicates the transaction's risk of being a fraudulent transaction.

8. The method defined in claim 1, wherein identifying the sources of fraudulent transactions comprises:
determining each acceptor's risk of being a phony acceptor, wherein phony acceptors comprise acceptors that have a high rate of fraudulent transactions; and
assigning a fuzzy value to each acceptor that indicates the acceptor's likelihood of being a phony acceptor.

9. The method defined in claim 1, wherein identifying the sources of fraudulent transactions comprises:
determining each acceptor's risk of being a compromising acceptor, wherein cardholder accounts that have had transactions with compromising acceptors have a higher rate of future fraudulent transactions; and
assigning a fuzzy value to each acceptor that indicates the acceptor's likelihood of being a compromising acceptor.

10. The method defined in claim 1, wherein receiving the transaction data from transactions between cardholder accounts and acceptors comprises receiving transaction data from authorized and unauthorized transactions.

11. The method defined in claim 1, wherein identifying the sources of fraudulent transactions comprises:
identifying acceptors having transaction amounts that are unusually high as compared to transactions amounts of other acceptors, wherein the transaction amounts were accumulated following a possible fraudulent transaction.

12. The method defined in claim 1, wherein identifying the sources of fraudulent transactions comprises:
identifying acceptors that have transaction amounts that are unusually high in a given time period as compared to transaction amounts for the same acceptors in earlier time periods.

13. The method defined in claim 1, further comprising:
assessing transaction authorization requests received from corresponding acceptors in real-time;
comparing the corresponding acceptors with a black list of suspicious acceptors; and
denying the transaction requests received from corresponding acceptors that appear on the black list of acceptors.

14. The method defined in claim 13, wherein the authorization requests have corresponding cardholder accounts, the method further comprising:
comparing the corresponding cardholder accounts with a list of high-risk cardholder accounts; and
denying the authorization requests that correspond to cardholder accounts that appear on the list of high-risk cardholder accounts.

15. The method defined in claim 13, wherein the authorization requests have corresponding cardholder accounts, the method further comprising:
comparing the corresponding cardholder accounts with a list of high-risk cardholder accounts; and
adjusting risk scores of the authorization requests that correspond to cardholder accounts that appear on the list of high-risk cardholder accounts.

16. The method defined in claim 13, wherein the authorization requests have corresponding cardholder accounts, the method further comprising:
comparing the corresponding cardholder accounts with a list of high-risk cardholder accounts; and
increasing risk scores of the authorization requests that correspond to cardholder accounts that appear on the list of high-risk cardholder accounts.

17. A method for using a fraud detection engine on a computing system, comprising:
- at the fraud detection engine on the computing system, receiving authorization requests between an acceptor and an acquirer;
- with the fraud detection engine on the computing system, analyzing authorization requests using fuzzy logic, comprising:
  - identifying, in real-time, fraudulent authorization requests;
  - placing the fraudulent authorization requests in a set of high-risk authorization requests; and
  - analyzing, in batch mode, the fraudulent authorization requests in the set of high-risk authorization requests to identify sources of fraudulent authorization requests, wherein the computing system has a distributed architecture;
- identifying authorization requests received from acceptors on a black list of acceptors; and
- placing cardholder accounts associated with authorization requests received from the acceptors on the black list of acceptors on a list of high-risk cardholder accounts.

* * * * *